United States Patent [19]

Ahsbahs et al.

[11] Patent Number: 5,708,493

[45] Date of Patent: Jan. 13, 1998

[54] PROGRESSIVE MULTIFOCAL OPHTHALMIC LENS

[75] Inventors: Françoise Ahsbahs, Saint-Maur-des-Fosses; Claude Pedrono, Briis Sous Forges, both of France

[73] Assignee: Essilor International, Charenton le Pont, France

[21] Appl. No.: 545,175

[22] Filed: Oct. 19, 1995

[30] Foreign Application Priority Data

Oct. 28, 1994 [FR] France .................. 94 12978

[51] Int. Cl.$^6$ .................................................. G02C 7/06
[52] U.S. Cl. .................................................. 351/169
[58] Field of Search .................................. 351/168, 169, 351/170, 171, 172

[56] References Cited

U.S. PATENT DOCUMENTS 5,000,559 3/1991 Takahashi et al. .................. 351/169

FOREIGN PATENT DOCUMENTS

2277997 11/1994 United Kingdom.

Primary Examiner—Scott J. Sugarman
Attorney, Agent, or Firm—Fish & Richardson P.C.

[57] ABSTRACT

A progressive multifocal ophthalmic lens is provided having an aspherical surface with a mean sphere and a cylinder at every point. The aspherical surface has a distance vision portion, with a control point for distance vision, a near vision portion with a control point for near vision, and an intermediate vision portion between the near vision portion and the distance vision portion. A power addition value A is defined as a variation in mean sphere between the control point for distance vision and the control point for near vision portion. A base B is defined as a value of mean sphere at the control point for distance vision. A width of the near vision portion varies not only as a function of the power addition value A, but also as a function of the value B of the base. The invention thereby ensures the presence of a substantially constant object field for all values of the power addition and of the base.

34 Claims, 4 Drawing Sheets

PROGRESSIVE MULTIFOCAL OPHTHALMIC LENS

BACKGROUND OF THE INVENTION

The present invention relates to a progressive multifocal ophthalmic lens that includes an aspherical or non-spherical surface having a mean sphere and a cylinder at every point thereof and comprising a distance vision portion, a near vision portion, an intermediate vision portion therebetween, a principal meridian of progression passing through the said three portions, the said lens having a power addition value defined as the variation in mean sphere between a point situated in the distance vision portion and a point situated in the near vision portion.

French patent 2,699,294 (equivalent to GB-A2,273,369) which is incorporated herein by reference described in its introductory passages the various elements that constitute a progressive multifocal ophthalmic lens (a principal meridian of progression, distance vision portion, near vision portion, etc.), together with the work carried out by this present applicant to improve the comfort of wearers of such lenses.

The applicant has also proposed, in order to better satisfy the visual requirements of presbyopia sufferers and to improve the comfort of progressive multifocal lenses, to adapt the form of the principal meridian of progression so that it becomes a function of the power addition value (applicant's French patent 2,683,642 (equivalent to U.S. Pat. No. 5,260,745)).

In U.S. Pat. No. 5,137,343, a progressive multifocal lens is disclosed in which the width of the near vision portion and of the intermediate vision portion are inversely proportional to the power addition value. In that patent, the width of said portions is defined as that part of the lens in which the cylinder is less than a fixed 0.5 diopter value. This patent mentions the possibility of different values for mean sphere at the distance vision control point. However, the surface characteristics of the lens are fixed independently of said values.

Existing lenses can be still further improved, notably for the purpose of reducing peripheral vision defects and for increasing wearer comfort. Progressive multifocal lens wearers sometimes experience discomfort with dynamic vision or when using the lateral areas of the near and distance vision portions. In particular, it is sometimes difficult for wearers of progressive multifocal lens to read a text without the need for head movement in order to maintain sufficient visual acuity.

SUMMARY OF THE INVENTION

The present invention provides a progressive multifocal lens which overcomes the disadvantages of prior art lenses and which enables the wearer to enjoy a substantially constant object field in the near vision portion regardless of the wearer's ametropy and the lens's power addition value, without this leading to deterioration of lens characteristics. The lens furthermore provides enhanced reading comfort by allowing the wearer to maintain a natural posture for close reading work. The term "object field" means the projection, in the reading plane, of the area scanned by the eye in near vision onto the lens. This part of the lens thus needs to have adequate optical qualities to ensure good near vision acuity.

The invention thus provides a progressive multifocal ophthalmic lens comprising an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lens having:

a power addition value A defined as a variation in mean sphere between said control point L for distance vision and said control point P for near vision, and a base B defined as a value of mean sphere at said control point L for distance vision, a width of said near vision portion varying not only as a function of said power addition value A, but also as a function of said base B, thereby ensuring presence of a substantially constant object field for all values of said power addition and said base.

In a manner known per se, a series of basic lenses are produced, each with a base corresponding to the lens power at the distance vision control point (the value of the base B is given by $B=(n-1)/RVL$, where RVL is the radius of curvature at the distance control point). In the case of progressive lenses, such basic lenses incorporate the relation between the value of the base and the power of the lens, in other words the wearer's ametropy, for distance vision. Typical values of the base can range from 0.5 to 10 diopters.

The invention thus ensures, regardless of the extent of ametropy of the wearer and of the power addition of the lens, the provision of a substantially constant object field in the near vision portion of the lens.

According to one preferred feature of the lens, the width of said near vision portion is set at a given height on the lens between two isocylinder lines having a cylinder value equal to A/2, said width being an increasing function of base B when power addition A is constant, and an increasing function of power addition A when base B is constant.

According to a feature of the lens, the width of said near vision portion is set at a height of said control point P for near vision on said lens.

The distance vision portion preferably extends at least between two straight lines each making an angle comprised in a range from 15° to 25° with an horizontal and which intersect at a point G situated close to a geometrical centre O of said lens.

Said point of intersection G may be situated midway along a segment joining said geometrical centre O of said lens and said control point L for distance vision.

In an embodiment of the invention, said lens has a slope of mean sphere within a radius of 25 mm around a geometrical centre O of the lens of a value less than a maximum value which is directly proportional to the power addition A of said lens.

In this case, a coefficient of proportionality $k_{smax}$ between said maximum value of said slope of mean sphere and said power addition may be comprised between 0.08 and 0.12 $mm^{-1}$ and may preferably be about 0.10 $mm^{-1}$.

According to another preferred feature, for each value of said base B, all points of coordinates $(A, L_{VP})$ plotting a possible width $L_{VP}$ of said near vision portion for a possible value of said power addition A, in a plot of $L_{VP}$ against A, are in an area comprised between a first straight line represented by equation $$L_{VP}=A_0+A_{1min} \cdot (A-0.5)$$

and two intersecting half lines one of which is defined, for values of power addition A on said plot less than or equal to 2.00 diopters, by equation:

$$L_{VP} = A_0 + A_{1max} \cdot (A - 0.5)$$

and another of which, for values of power addition on said plot greater than or equal to 2.00 diopters, is substantially horizontal, said half lines intersecting at a point whose coordinate along said power addition axis of said plot is 2.00, where $A_0$ and $A'_0$ are expressed in mm and vary as a function of said base B, $A_{1min}$ and $A_{1max}$ are fixed value coefficients, expressed in mm per diopter, that are independent of said base B, and A is the power addition of said lens expressed in diopters.

In this case, coefficients $A_{1min}$ and $A_{1max}$ may have respective values of 0.50 and 1.80 mm per diopter, regardless of the value of said base.

The difference between the coordinate along said $L_{VP}$ axis of said point of intersection of said two half lines and the coordinate along said $L_{VP}$ axis of the point of said first straight line at a value of 2.00 diopters on the power addition axis, is preferably less than 0.50 mm.

Further features and advantages of the invention will become more clear from the description that follows of one preferred embodiment of the invention provided by way of non-limiting example, and with reference to the attached drawings.

DETAILED DESCRIPTION OF A PREFERRED EMBODIMENT

FIGS. 1 to 7 show the optical characteristics of various lenses, considering a lens diameter of around 60 mm. An orthonormed coordinate system is used in the description which follows, the x-axis corresponding to the horizontal axis of the lens, and the y-axis to the vertical axis of the lens. One embodiment of the lens is described, with reference to FIGS. 1 to 7.

Figure 1:
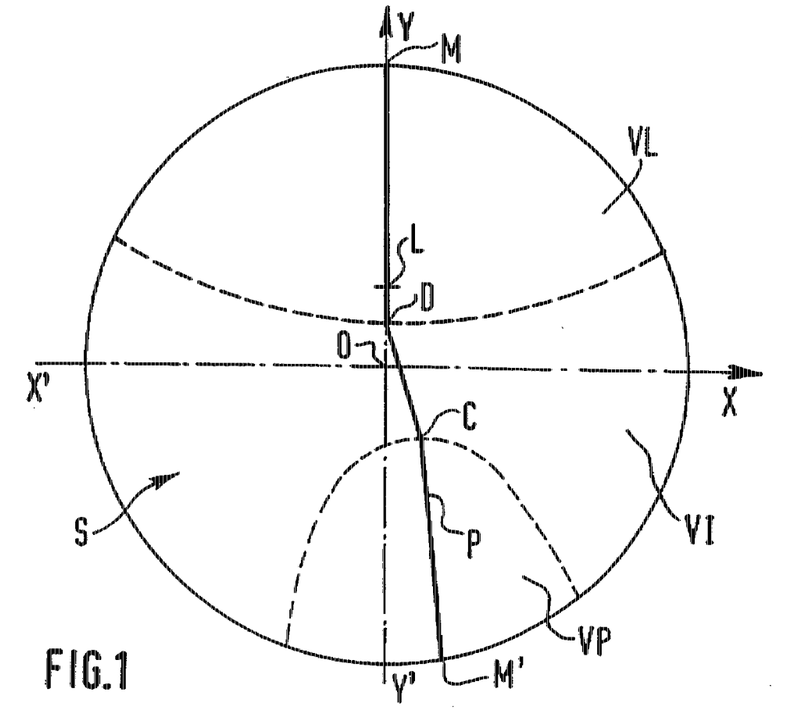
FIG. 1 is a diagrammatical front view of a progressive multifocal lens.

FIG. 1 is a front view of a progressive multifocal lens 1. Lens 1 has an aspherical face shown in FIG. 1, the other face being spherical or toroidal. The principal meridian of progression MM' of the lens is shown as a bold line in FIG. 1, L being the distance vision control point and P being the near vision control point.

Conventionally, lens 1 comprises a distance vision portion VL in its upper region and a near vision portion VP in its lower region, and an intermediate zone VI existing between the two. In FIG. 1, the point O is the diametrical centre of lens 1.

The principal meridian of progression MM' of the lens is essentially composed of three segments, the first one extending substantially vertically from the top of the lens, passing through the point L, down to a point D, referred to as the fitting centre, and located between the distance vision control point L and the diametrical centre O. The second segment extends from point D obliquely towards the nasal side of the lens, and the third segment starts from the end C of the second segment and passes through the near vision control point P. The relative angles of these segments advantageously vary as a function of the power addition value A, as described by the applicant in U.S. Pat. No. 5,270,745.

For every point on the aspherical surface, a mean sphere D is defined from the formula:

$$D = \frac{n-1}{2} \left( \frac{1}{R_1} + \frac{1}{R_2} \right)$$

in which:

$R_1$ and $R_2$ are the maximum and minimum radii of curvature expressed in meters, and n is the refractive index of the lens material.

Cylinder C is defined by the formula:

$$C = (n-1) \left| \frac{1}{R_1} - \frac{1}{R_2} \right|$$

Isosphere lines are lines constituted by the projection onto a plane tangential to the progressive surface at the geometrical centre O of points on the lens surface having the same value of mean sphere. Similarly, isocylinder lines are lines constituted by the projection onto this same plane of points having the same cylinder.

It is usually considered that the isocylinder line for points of 0.5 diopter mean cylinder represents substantially the border between the distance vision portion and the intermediate vision portion.

In this invention, we consider that the isocylinder line for points of cylinder equal to A/2 represents substantially the border between the intermediate portion and the near vision portion.

In prior art lenses, and in particular in the applicant's prior art lenses, vision in the area neighbouring the principal meridian of progression is completely satisfactory.

In order to increase near vision comfort and to take account of the special requirement of each wearer, this invention proposes to consider a new definition of the characteristics of a lens surface, not only in terms of power addition but additionally as a function of the wearer's ametropy, or, to be more specific, as a function of mean sphere at the distance vision control point L, in other words what is known as the base of the lens. This provides a new definition of a family of lenses, the family having, for a given power addition factor, surfaces that differ as a function of the various values of lens base. A family of lenses according to the invention typically comprises 13×n lenses; power addition can vary in 0.25 diopter steps in a range from 0.5 to 3.5 diopters (giving 13 possible values), while the base can also have n values and, with reference to what will be described below, three values such as, to take a non-limiting example, 3.75, 5.50 and 6.50 diopters.

The rear face of the lens according to the invention is used to adapt the lens to the wearer's ametropy, and this face can be spherical or toroidal.

FIGS. 2 to 7 are front view of lenses according to the invention showing the principal meridian of progression and isosphere or isocylinder lines. The lenses in FIGS. 2 to 7 correspond to a power addition of 2 diopters. In the lens shown in FIGS. 2 and 3, the value of the base is 3.75 diopters.

Figure 2:
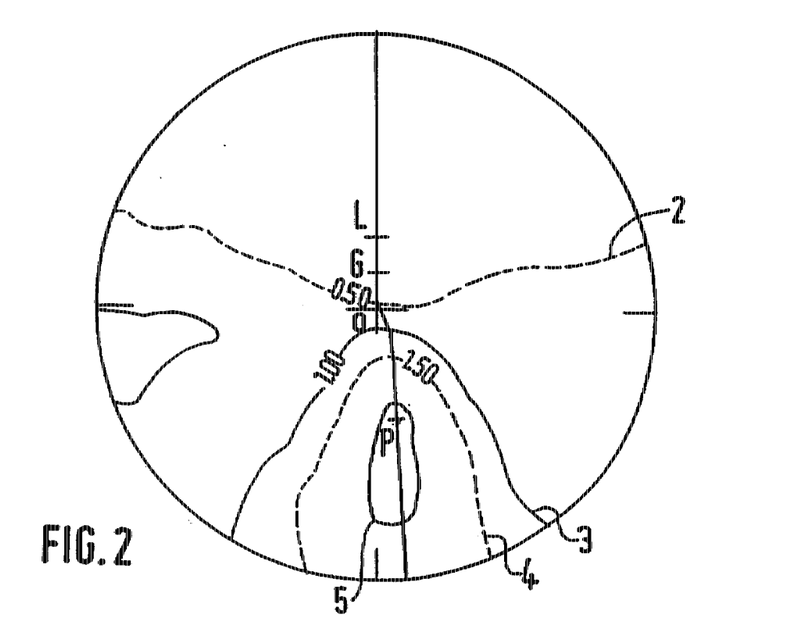
FIG. 2 is a front view of the lens according to the invention for a base of 3.75 diopters, showing the principal meridian of progression and lines joint points that have the same mean sphere.

FIG. 2 incorporates some of the elements from FIG. 1 and additionally includes lines of isosphere. These lines in FIG. 2 are the lines marked 2, 3, 4 and 5 which respectively correspond to a mean sphere which is higher by 0.5, 1, 1.5 or 2 diopters than the mean sphere at the distance vision control point L.

Figure 3:
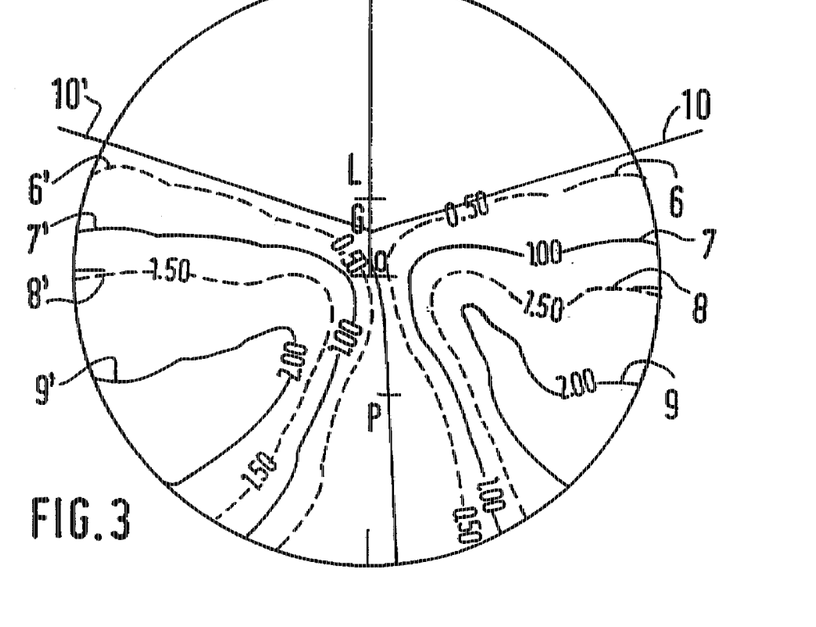
FIG. 3 is a front view of the lens according to the invention for a base of 3.75 diopters, showing the principal meridian of progression and lines joint points having the same cylinder.

Similarly, FIG. 3 reproduces some of the elements from FIGS. 1 and 2 and additionally shows lines of isocylinder. As cylinder is low along the principal meridian of progression, there are actually two isocylinder lines for each value of cylinder. The isocylinder lines in FIG. 3 are the lines 6 and 6', 7 and 7', 8 and 8', 9 and 9', which respectively represent a cylinder of 0.5, 1, 1.5 or 2 diopters.

As indicated above, the 0.5 diopter isocylinder lines (6 and 6') substantially define the border, in the upper part of the lens, between the distance vision portion and the intermediate portion.

As can be seen on FIG. 3, the distance vision portion VL is defined by two straight lines 10 and 10' which cut at a point G, making an angle of the order of 20° with the horizontal. The point G on FIG. 3 is halfway between the distance vision control point L and the geometrical centre O of the lens.

The point P of the near vision portion is here 12 mm below the geometrical centre of the lens, and is offset horizontally therefrom by a distance of 2.29 mm.

If one now measures the width of the near vision portion VP (between the 1 diopter isocylinder (A/2) lines 7, 7' in the lower part of the lens), it is found that this width is of the order of 13.5 mm.

Figure 4:
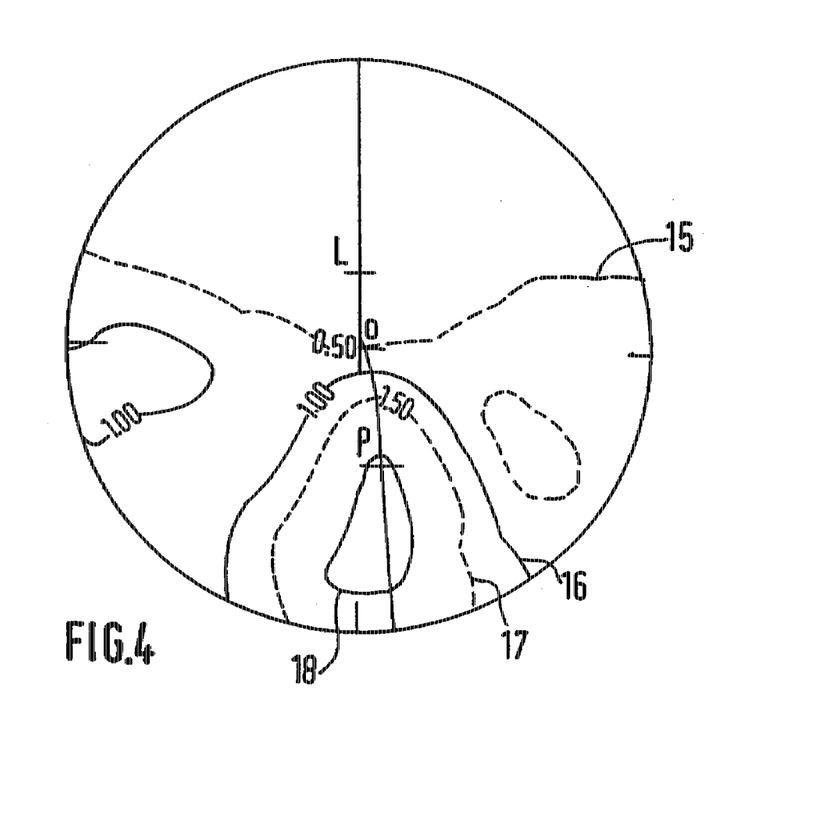
FIG. 4 is a view similar to that of FIG. 2, for a base of 5.5 diopters.

FIG. 4 is a view similar to FIG. 2, for a base of 5.5 diopters. FIG. 4 shows the same elements as FIG. 2 and, notably, lines 15, 16, 17 and 18 showing means isosphere of 0.5, 1, 1.5 and 2 diopters.

Figure 5:
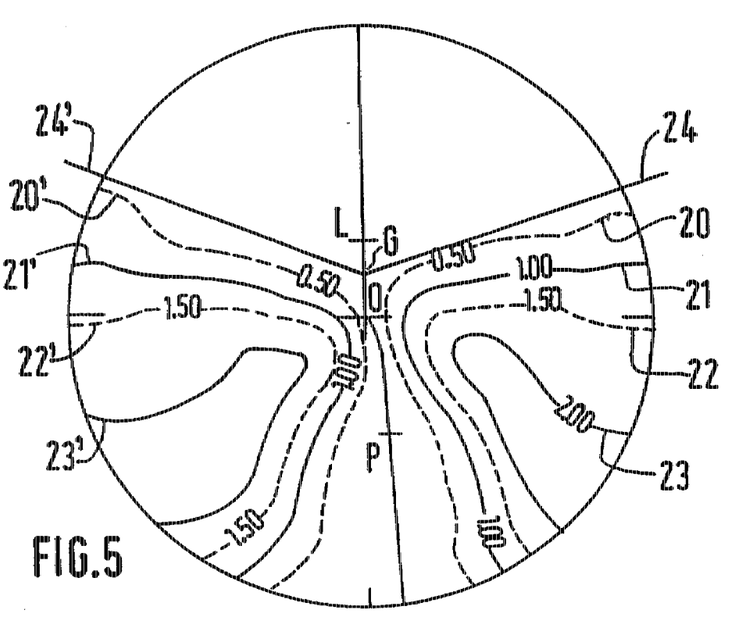
FIG. 5 is a view similar to that of FIG. 3, for a base of 5.5 diopters.

FIG. 5 is a similar view to FIG. 3, for a base of 5.5 diopters, in other words for the lens in FIG. 4. In FIG. 5, the 0.5, 1, 1.5 and 2 diopter isocylinder lines are indicated respectively by the reference numerals 20 and 20', 21 and 21', 22 and 22', 23 and 23'. Like the lens in FIGS. 2 and 3, the distance vision portion (within the 0.5 diopter isocylinder line in the upper part of the lens) is substantially delimited by two straight lines 24, 24' intersecting at a point G, and making an angle of the order of 20° with the horizontal. Point G is halfway between the distance vision control point L and the geometrical centre O of the lens.

If the width of the near vision portion is measured for this lens 12 mm below the geometrical centre of the lens (1 diopter (A/2) isocylinder lines 21, 21' in the lower part of the lens), a value of the order of 14.5 mm is found. Again, point P in the near vision portion is situated 12 mm below the geometrical centre of the lens, and is horizontally offset with respect to the latter by 2.43 mm.

Figure 6:
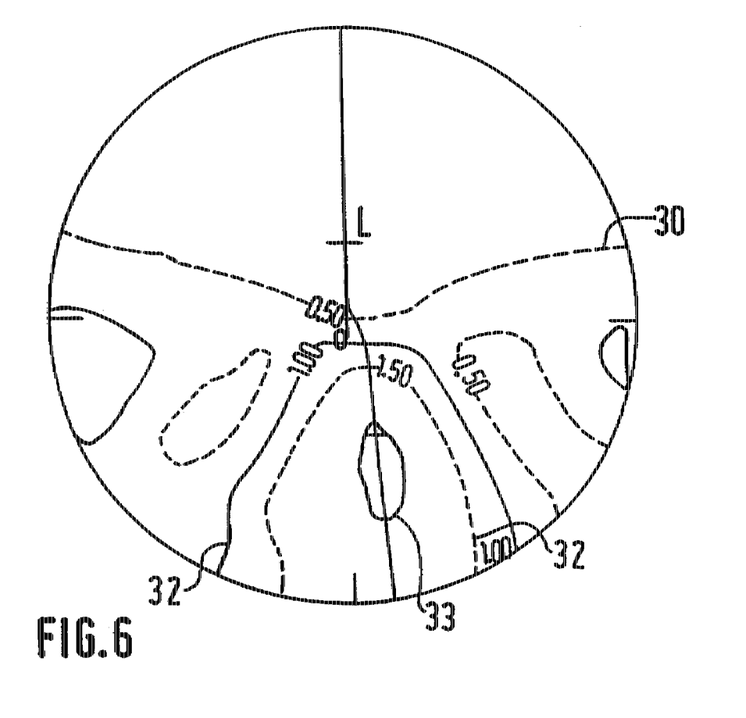
FIG. 6 is a view similar to that of FIG. 2, for a base of 6.5 diopters.

FIG. 6 is a view similar to that in FIG. 2 for a base of 6.5 diopters. The same elements as those indicated on FIGS. 2 and 4 are also encountered on FIG. 6, notably lines 30, 31, 32, 33 for 0.5, 1, 1.5 and 2 diopter mean isosphere.

Figure 7:
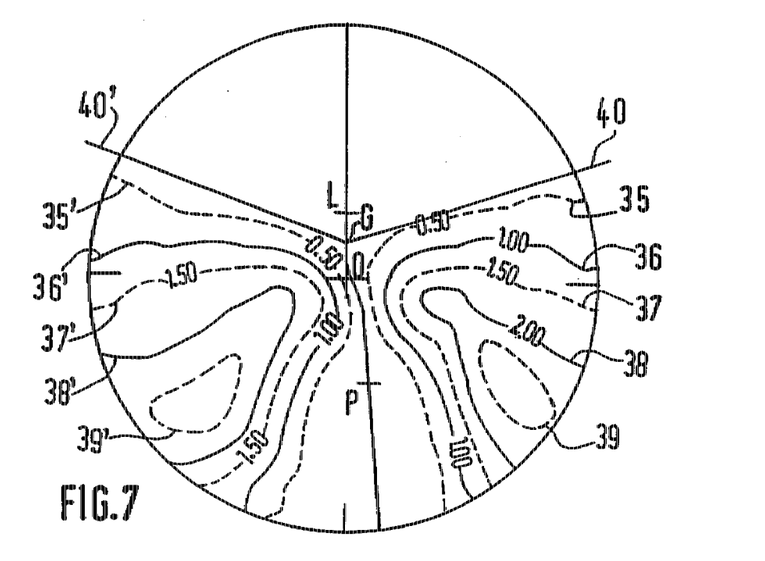
FIG. 7 is a view similar to that of FIG. 3, for a base of 6.5 diopters.

FIG. 7 is a similar view to that in FIGS. 3 or 5, for a base of 6.5 diopters. On FIG. 7, the 0.5, 1, 1.5, 2 and 2.5 diopter isocylinder lines are identified by the reference numerals 35 and 35', 36 and 36', 37 and 37', 38 and 38' and 39 and 39'. Like the lens in FIGS. 2 and 3, or the one in FIGS. 4 and 5, the distance vision portion (0.5 diopter isocylinder line in the upper part of the lens) is substantially delimited by two straight lines 40, 40' intersecting at a point G, making an angle of the order of 20° with the horizontal. The point G is midway along a segment joining the distance vision control point L and the geometrical centre O of the lens. Point P in the near vision portion is 12 mm below the geometrical centre O of the lens and is horizontally offset with respect thereto by 2.74 mm.

If the width of the near vision portion is measured for this lens 12 mm below the geometrical centre of the lens (1 diopter (A/2) isocylinder lines 36, 36' in the lower part of the lens), a value of the order of 16.0 mm is found.

According to the invention, the various lenses of the family of progressive multifocal lenses thus have, for a given power addition value, surfaces that vary as a function of the base. In particular, for a given value of power addition A, the width of the near vision portion measured between the A/2 isocylinder lines varies as a function of the base and is an increasing function thereof. This increase in near vision width as a function of the base ensures greater visual comfort in the near vision portion while at the same time maintaining optimum characteristics in the distance vision portion. Notably, this allows spectacle wearers to read a text of a standard format (an A4 page for example) without needing to move their head in order to stay within the near vision portion.

The various characteristics that enable the various lenses according to the invention to be obtained will now be described. The lens surface is, in a known manner, continuous and three times continuously differentiable.

For each lens of the family, a principal meridian of progression is defined. Advantageously the teachings of French patent 2,683,642 referred to above, which is incorporated herein by reference, can be used for this. Any other definition of principal meridian of progression could obviously also be used in order to practice the teachings of the invention.

The limits of the distance vision portion, regardless of the value of power addition and the base, are fixed by two intersecting lines. As explained with reference to FIGS. 3, 5 and 7, these two straight lines can intersect at a point midway between the geometrical centre of the lens and the distance vision control point. Each of these straight lines makes an angle comprised in the range 15° to 25°, preferably of the order of 20°, with the horizontal. In the sector defined by these lines, cylinder is less than 0.5 diopter. These values of angle are not crucial for implementation of the invention; the indicated values provide dimensions for the distance vision portion ensuring good visual comfort.

The principal meridians of progression shown in the drawings are those for which the distance vision control point L is located 8 mm above the geometrical centre of all the lenses in the family (its coordinate $(x_L, y_L)$ thus being $(0, 8)$ in the usual orthonormed coordinate system). In this case the straight lines defining the distance vision portion intersect at a point 4 mm above the geometrical centre of the lens (at a point having coordinates $(x_G, y_G)$ of $(0, 4)$). These values can be modified as a function of the principal meridian of progression adopted; the point of intersection G could also be situated at the geometrical centre O of the lens or at the distance vision control point L.

According to the invention, the width of the near vision portion, determined at a given height (x-axis coordinate) and between the A/2 isocylinder lines varies as a function of power addition and also as a function the base. For a given power addition, the width of the near vision portion increases with the base thereby ensuring a corresponding degree of reading comfort for the wearer in the near vision portion.

The table below gives the width in millimeter of the near vision portion as a function of power addition (A) and base (B) for the embodiment we are describing and which is shown in the drawings.

TABLE 1

| B | A | 1.00 | 2.00 | 3.00 |
|---|---|------|------|------|
| 3.75 | | 12.4 | 13.5 | 13.7 |
| 5.50 | | 13.1 | 14.5 | 14.7 |
| 6.50 | | 15.4 | 16.0 | 16.4 |

The values in table 1 are given for a near vision portion width set 12 mm below the geometrical centre of the lens. This in fact corresponds to the y-axis coordinate of the near vision control point P, but this is not significant and any other point (for example 10 mm below the geometrical centre of the lens) could have been chosen to determine the width of the near vision portion. More generally, one can chose to set the width of the near vision portion at a y-axis coordinate for which 85% of the power addition is obtained, this being for example a y-axis coordinate comprised between −10 and −14 mm. One can also chose to fix the width of the near vision portion at a y-axis coordinate that is constant with respect to the distance vision control point L, for example 20 mm below said distance vision control point L. Similarly, one can set the width of the near vision portion as above at the y-axis coordinate of the near vision control point P, the latter optionally varying as a function of how the principal meridian of progression is defined.

The values given in the table below for a power addition of 2 are those obtained, by way of example, with the lens shown in FIGS. 3, 5 and 7. For a constant power addition, the width of the near vision portion increases as a function of the base that applies to the particular wearer.

This gives a good degree of user comfort in the near vision portion even for high power additions. Effectively, it ensures the provision of a reading field of substantially constant dimensions regardless of the value of the base, taking into account prismatic effects (a converging effect for high value base, a diverging effect for a low value base).

Figure 8:
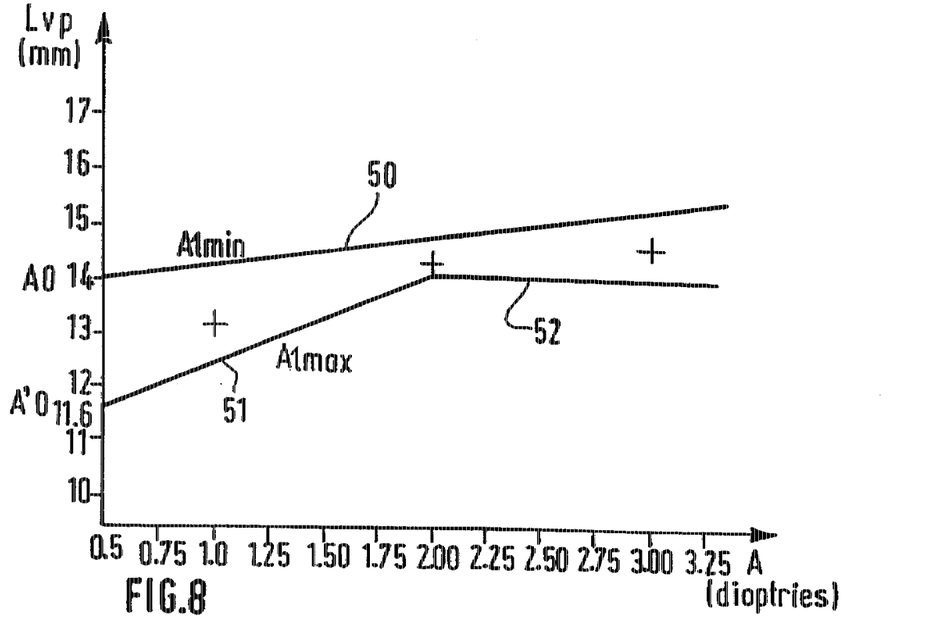
FIG. 8 is a diagram showing possible values for the width of the near vision portion, as a function of power addition for a given base.

FIG. 8 shows possible values for the width of the near vision portion as a function of power addition, for a given base. In FIG. 8, the width $L_{VP}$ of the close vision portion VP is shown on the y-axis, the x-axis giving power addition A in diopters. The crosses on FIG. 8 show points corresponding to various values for the width of the near vision portion for a given base for the three power additions listed in table 1 above. According to the invention, points corresponding to the various possible values for the pair (A, $L_{VP}$) lie in an area of the A, $L_{VP}$ plane comprised between a straight line 50 and two intersecting half lines 51 and 52. The equation representing line 50 is as follows:

$$L_{VP} = A_0 + A_{1min} \cdot (A-0.5)$$

The equation representing the first half line 51, for values of A less than or equal to 2.00 diopters is:

$$L_{VP} = A'_0 + A_{1max} \cdot (A-0.5)$$

The second half line 52, for values of A greater than or equal to 2.00 diopters cuts the first half line 51 at the point (A=2.00; $L_{VP}$ for A=2.00), and is substantially horizontal.

At the value A=2.00 on the x-axis, the difference in the y-axis values of the point on line 50 where A=2.00 and the point of intersection of the two half lines 51 and 52 is equal to $A_2$.

The coefficients $A_{1min}$, $A_{1max}$ and $A_2$ have the following values, regardless of the value of the base:

$A_{1min}$=0.50 mm per diopter
$A_{1max}$=1.80 mm per diopter
$A_2$=0.50 mm

The value of the coefficients $A_0$ and $A'_0$ can vary, depending on the base. For example, for a base of 5.50, the coefficients $A_0$ and $A'_0$ have the respective values 14.0 and 11.6 mm.

A limit is also imposed, according to the invention, on maximum slope of mean sphere, firstly along the principal meridian of progression and, secondly, at the nasal and temporal sides of the lens.

Advantageously, the slope of mean sphere is a function of power addition. For example, one can determine that the maximum value of mean sphere slope will be a linear function of power addition, of the type $k_{smax} \cdot A$. The value of the coefficient $k_{smax}$ can be comprised between 0.08 and 0.12 mm$^{-1}$, and is preferably of the order of 0.10 mm$^{-1}$.

At the nasal and temporal sides of the lens, the slope of mean sphere is less than the slope of maximum sphere, this applying to a radius of 25 mm around the geometrical centre of the lens.

In order to completely define a lens according to the invention, the limiting conditions stated above, or only some of them, are employed. Such limiting conditions are utilised in an optimization program, known per se, for mapping the altitudes of the various points on the lens. This allows molds to be prepared using a method known per se, and lenses to be molded using organic or inorganic materials.

By way of example, one can impose the following conditions in order to define a lens having a power addition of 2 and base of 3.75 diopters:

continuous surface continuously differentiable three times;

cylinder less than 0.5 diopters in a sector defined by two straight lines making an angle of 20° with the horizontal and intersecting at a point G with coordinates ($x_G$, $Y_G$)=(0, 4) (this defining the distance vision portion);

a near vision portion of a width (measured between the A/2 isocylinder lines for 1 diopter) of at least 13.5 mm when measured 12 mm below the geometrical centre of the lens;

a maximum sphere slope of 0.1×A=0.2 diopters per mm in a 25 mm radius circle centred on the geometrical centre of the lens;

a principal meridian of progression as defined in the applicant's French patent 2,683,642.

These various conditions make it possible to define the surface of the lens.

More generally, in order to implement the invention and ensure the existence of a substantially constant object field for all values of power addition and base, a family of lenses can be defined as follows:

choice of 3 values for the base, for example 3.75, 5.50 and 6.50 diopters;

choice of 3 power addition values, for example 1.00, 2.00 and 3.00 diopters;

for each of the corresponding nine aspherical surfaces thus defined, the choice of suitable principal meridian of progression;

for each one of the corresponding nine aspherical surfaces, calculation of the base at the near vision control point P;

for each of the nine corresponding aspherical surfaces, calculation, starting out from the value of the base at point P, of the width of the near vision portion (between the A/2 isocylinder lines) corresponding to a visual reading field that includes, for example, an A4 format sheet of paper;

and then optimization calculation, using successive iterations, for each one of the aspherical surfaces.

The present invention is obviously not limited to this description of a preferred embodiment: thus, among other things, the aspherical surface could be the surface directed towards the spectacle wearer. Moreover, it was considered superfluous to mention in the description that the lenses can of course be different for the two eyes, as is well known to those skilled in the art.

We claim:

1. A progressive multifocal ophthalmic lens comprising an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lens having:

a power addition value A defined as a variation in mean sphere between said control point L for distance vision and said control point P for near vision, a base B defined as a value of mean sphere at said control point L for distance vision, and a width of said near vision portion corresponding to an object field of a select size, wherein said width is defined as a function of said power addition value and said base which has a form that the width maintains said object field of said select size for varying values of said power addition value and said base thereby ensuring presence of a substantially constant object field for various values of said power addition and said base.

2. A progressive multifocal ophthalmic lens according to claim 1, wherein the width of said near vision portion is set at a given height on the lens between two isocylinder lines having a cylinder value equal to A/2, said width being an increasing function of base B when power addition A is constant, and an increasing function of power addition A when base B is constant.

3. A progressive multifocal ophthalmic lens according to claim 2, wherein the width of said near vision portion is set at a height of said control point P for near vision on said lens.

4. A progressive multifocal ophthalmic lens according to one of claim 1, wherein said distance vision portion extends at least between two straight lines each making an angle comprised in a range from 15° to 25° with an horizontal and which intersect at a point G situated close to a geometrical centre O of said lens.

5. A progressive multifocal ophthalmic lens according to claim 4, wherein said point of intersection G is situated midway along a segment joining said geometrical centre O of said lens and said control point L for distance vision.

6. A progressive multifocal ophthalmic lens according to one of claim 1, wherein said lens has a slope of mean sphere within a radius of 25 mm around a geometrical centre O of the lens of a value less than a maximum value which is directly proportional to the power addition A of said lens.

7. The lens according to claim 6, wherein a value of a coefficient of proportionality $k_{smax}$ between said maximum value of said slope of mean sphere and said power addition is comprised between 0.08 and 0.12 $mm^{-1}$ and is preferably about 0.10 $mm^{-1}$.

8. The lens according to claim 6, wherein a value of a coefficient of proportionality $k_{smax}$ between said maximum value of said slope of mean sphere and said power addition is about 0.10 $mm^{-1}$.

9. The lens according to claim 1, wherein for each value of said base B, all points of coordinates $(A, L_{VP})$ plotting a possible width $L_{VP}$ of said near vision portion for a possible value of said power addition A, in a plot of $L_{VP}$ against A, are in an area comprised between a first straight line represented by equation $$L_{VP} = A_0 + A_{1min} \cdot (A - 0.5)$$

and two intersecting half lines one of which is defined, for values of power addition A on said plot less than or equal to 2.00 diopters, by equation:

$$L_{VP} = A'_0 + A_{1max} \cdot (A - 0.5)$$

and another of which, for values of power addition on said plot greater than or equal to 2.00 diopters, is substantially horizontal, said half lines intersecting at a point whose coordinate along said power addition axis of said plot is 2.00, where $A_0$ and $A'_0$ are expressed in mm and vary as a function of said base B, $A_{1min}$ and $A_{1max}$ are fixed value coefficients, expressed in mm per diopter, that are independent of said base B, and A is the power addition of said lens expressed in diopters.

10. The lens according to claim 9, wherein coefficients $A_{1min}$ and $A_{1max}$ have respective values of 0.50 and 1.80 mm per diopter, regardless of the value of said base.

11. The lens according to claim 9, wherein the difference between the coordinate along said $L_{VP}$ axis of said point of intersection of said two half lines and the coordinate along said $L_{VP}$ axis of the point of said first straight line at a value of 2.00 diopters on the power addition axis, is less than 0.50 mm.

12. The lens according to claim 10, wherein the difference between the coordinate along said $L_{VP}$ axis of said point of intersection of said two half lines and the coordinate along said $L_{VP}$ axis of the point of said first straight line at a value of 2.00 diopters on the power addition axis, is less than 0.50 mm.

13. A progressive multifocal ophthalmic lens comprising an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lens having:

a power addition value A defined as a variation in mean sphere between said control point L for distance vision and said control point P for near vision, a base B defined as a value of mean sphere at said control point L for distance vision, and a width of said near vision portion varying not only as a function of said power addition value A, but also as a function of said base B, thereby ensuring presence of a substantially constant object field for various values of said power addition and said base, wherein said lens has a slope of mean sphere within a radius of 25 mm around a geometrical center O of the lens of a value less than a maximum value which is directly proportional to the power addition A of said lens.

14. The lens according to claim 13, wherein a value of a coefficient of proportionality $k_{smax}$ between said maximum value of said slope of mean sphere and said power addition is comprised between 0.08 and 0.12 mm$^{-1}$ and is preferably about 0.10 mm$^{-1}$.

15. The lens according to claim 13, wherein a value of a coefficient of proportionality $k_{smax}$ between said maximum value of said slope of mean sphere and said power addition is about 0.10 mm$^{-1}$.

16. A progressive multifocal ophthalmic lens comprising an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lens having:

a power addition value A defined as a variation in mean sphere between said control point L for distance vision and said control point P for near vision, a base B defined as a value of mean sphere at said control point L for distance vision, and a width of said near vision portion varying not only as a function of said power addition value A, but also as a function of said base B, thereby ensuring presence of a substantially constant object field for various values of said power addition and said base, wherein for each value of said base B, all points of coordinates (A, $L_{VP}$) plotting a possible width $L_{VP}$ of said near vision portion for a possible value of said power addition A, in a plot of $L_{VP}$ against A, are in an area comprised between a first straight line represented by equation $$L_{VP}=A_0+A_{1min} \cdot (A-0.5)$$

and two intersecting half lines one of which is defined, for values of power addition A on said plot less than or equal to 2.00 diopters, by equation:

$$L_{VP}=A'_0+A_{1max} \cdot (A-0.5)$$

and another of which, for values of power addition on said plot greater than or equal to 2.00 diopters, is substantially horizontal, said half lines intersecting at a point whose coordinate along said power addition axis of said plot is 2.00, where $A_0$ and $A'_0$ are expressed in mm and vary as a function of said base B, $A_{1min}$ and $A_{1max}$ are fixed value coefficients, expressed in mm per diopter, that are independent of said base B, and A is the power addition of said lens expressed in diopters.

17. The lens according to claim 16, wherein coefficients $A_{1min}$ and $A_{1max}$ have respective values of 0.50 and 1.80 mm per diopter, regardless of the value of said base.

18. The lens according to claim 16, wherein the difference between the coordinate along said $L_{VP}$ axis of the point of said first straight line at a value of 2.00 diopters on the power addition axis, is less than 0.50 mm.

19. The lens according to claim 17, wherein the difference between the coordinate along said $L_{VP}$ axis of said point of intersection of said two half lines and the coordinate along said $L_{VP}$ axis of the point of said first straight line at a value of 2.00 diopters on the power addition axis, is less than 0.50 mm.

20. A family of progressive multifocal ophthalmic lenses having various values of base and/or power addition values, wherein each lens comprises an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lenses having:

a power addition value A defined as a variation in mean sphere between said control point L for distance vision and said control point P for near vision, and a base B defined as a value of mean sphere at said control point L for distance vision, and a width of said near vision portion corresponding to an object field of a select size, wherein said width is defined as a function of said power addition value and said base which has a form that the width maintains said object field of said select size for varying values of said power addition value and said base thereby ensuring presence of a substantially constant object field for various values of said power addition and said base.

21. A method of manufacturing a progressive multifocal ophthalmic lens, said lens comprising an aspherical surface having a mean sphere and a cylinder at every point thereof, said surface comprising:

a distance vision portion including a control point L for distance vision, a near vision portion including a control point P for near vision, an intermediate vision portion between said distance vision portion and said near vision portion, a principal meridian of progression passing through said three portions, the said lens having:

a power addition value A defined as a variation in mean sphere between said control point L for distance vision and said control point P for near vision, a base B defined as a value of mean sphere at said control point L for distance vision, and a width of said near vision portion, said method comprising:
  selecting a power addition value and a base,
  defining an object field of select size,
  determining the width of said near vision portion to correspond to said object field by calculating said width as a function of said power addition value and said base.

22. The method of claim 21, wherein the width of said near vision portion is set at a given height on the lens between two isocylinder lines having a cylinder value equal to A/2, said width being in increasing function of base B when power addition A is constant, and an increasing function of power addition A is constant.

23. The method of claim 22, wherein the width of said near vision portion is set at a height of said control point P for near vision on said lens.

24. The method of claim 21, wherein said distance vision portion extends at least between two straight lines each making an angle comprised in a range from 15° to 25° with an horizontal and which intersect at a point G situated close to a geometrical centre O of said lens.

25. The method of claim 24, wherein said point of intersection G is situated midway along a segment joining said geometrical centre O of said lens and said control point L for distance vision.

26. The method of claim 21, wherein said lens has a slope of mean sphere within a radius of 25 mm around a geometrical center O of the lens of a value less than a maximum value which is directly proportional to the power addition A of said lens.

27. The method of claim 26, wherein a value of a coefficient of proportionality $k_{smax}$ between said maximum value of said slope of mean sphere and said power addition is comprised between 0.08 and 0.12 $mm^{-1}$ and is preferably about 0.10 $mm^{-1}$.

28. The method of claim 26, wherein a value of a coefficient of proportionality $k_{smax}$ between said maximum value of said slope of mean sphere and said power addition is about 0.10 $mm^{-1}$.

29. The method of claim 21, wherein for each value of said base B, all points of coordinates (A, $L_{VP}$) plotting a possible width $L_{VP}$ of said near vision portion for a possible value of said power addition A, in a plot of $L_{VP}$ against A, are in the area comprised between a first straight line represented by equation $$L_{VP} = A_0 + A_{1min} \cdot (A - 0.5)$$

and two intersecting half lines one of which is defined, for values of power addition A on said plot less than or equal to 2.00 diopters, by equation:

$$L_{VP} = A'_0 + A_{1max} \cdot (A - 0.5)$$

and another of which, for values of power addition on said plot greater than or equal to 2.00 diopters, is substantially horizontal, said half lines intersecting at a point whose coordinate along said power addition axis of said plot is 2.00, where $A_0$ and $A'_0$ are expressed in mm and vary as a function of said base B, $A_{1min}$ and $A_{1max}$ are fixed value coefficients, expressed in mm per diopter, that are independent of said base B, and A is the power addition of said lens expressed in diopters.

30. The method of claim 29, wherein coefficients $A_{1min}$ and $A_{1max}$ have respective values of 0.50 and 1.80 mm per diopter, regardless of the value of said base.

31. The method of claim 29, wherein the difference between the coordinate along said $L_{VP}$ axis of said point of intersection of said two half lines and the coordinate along said $L_{VP}$ axis of the point of said first straight line at a value of 2.00 diopters on the power addition axis, is less than 0.50 mm.

32. The method of claim 30, wherein the difference between the coordinate along said $L_{VP}$ axis of said point of intersection of said two half lines and the coordinate along said $L_{VP}$ axis of the point of said first straight line at a value of 2.00 diopters on the power addition axis, is less than 0.50 mm.

33. The method of claim 21 comprising:
  manufacturing a family of lenses having differing values of base.

34. The method of claim 33 comprising:
  manufacturing a family of lenses having differing values of power addition value.

* * * * *